A. C. McCLAUGHRY.
CORSET PATTERN SYSTEM.
APPLICATION FILED FEB. 20, 1917.
1,256,029.
Patented Feb. 12, 1918.
2 SHEETS—SHEET 1.
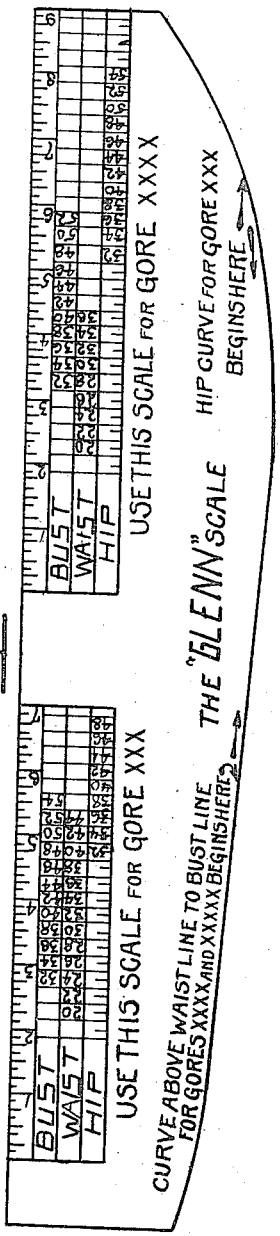
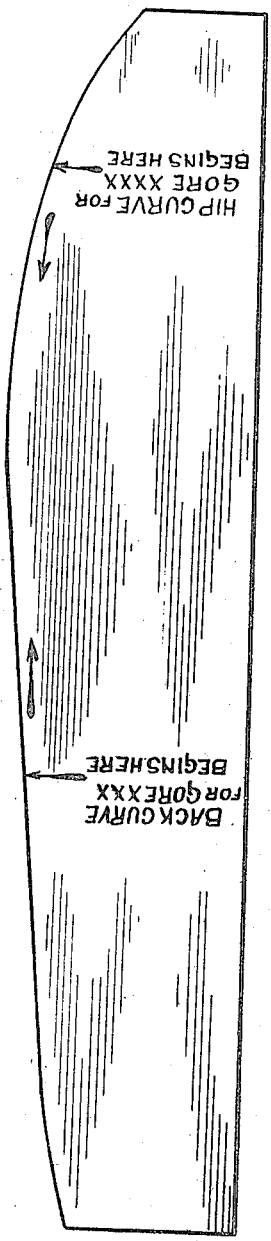
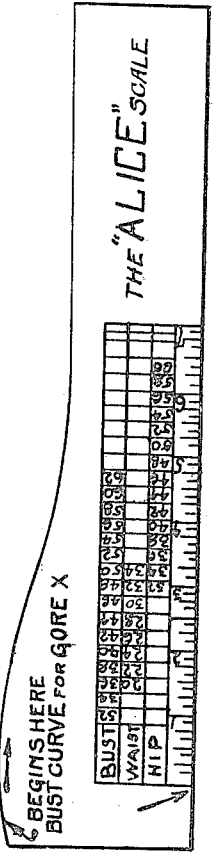

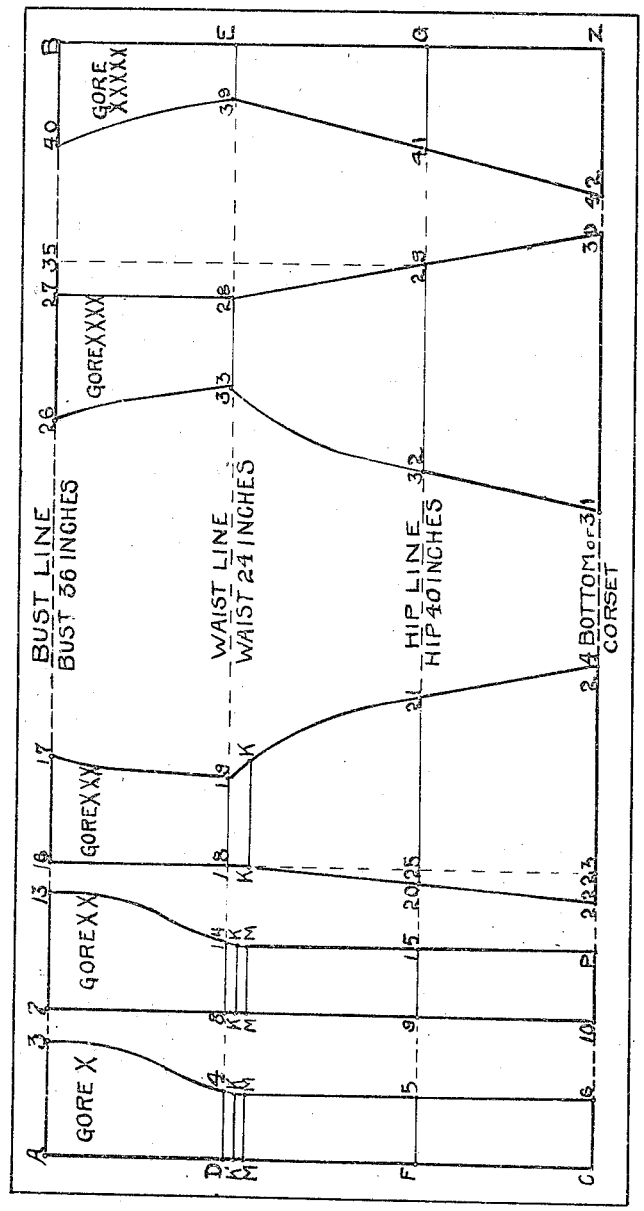

UNITED STATES PATENT OFFICE.

ARTHUR C. McCLAUGHRY, OF CHICAGO, ILLINOIS.

CORSET-PATTERN SYSTEM.

1,256,029.
Specification of Letters Patent.
Patented Feb. 12, 1918.

Application filed February 20, 1917. Serial No. 149,913.

*To all whom it may concern:*

Be it known that I, ARTHUR C. MCCLAUGHRY, a citizen of the United States, and a resident of the city of Chicago, in the county of Cook and State of Illinois, have invented certain new and useful Improvements in Corset-Pattern Systems; and I do hereby declare that the following is a full, clear, and exact description of the same, reference being had to the accompanying drawings, and to the numerals of reference marked thereon, which form a part of this specification.

This invention relates to the construction of means for use to simplify the art of corset making, thus making it possible for any seamstress to readily make a custom-made corset for herself or for other persons.

It is an object therefore of this invention to construct scales by which the pattern for a corset may be laid out, after obtaining the measurements of the bust line, waist line, hip line and bottom line of a corset of the person to be fitted.

It is also an object of this invention to provide scales for use in an improved system of corset making whereby any person is enabled to lay out the pattern for a corset after merely taking a few simple measurements of the person to be fitted.

It is furthermore an important object of this invention to provide a system of corset making requiring only the use of two scales of simple construction whereby the dimensions of the gores are obtained for laying out the pattern after a few certain measurements of the person to be fitted have been taken.

It is finally an object of this invention to provide an improved system of corset making whereby any person is enabled to lay out a corset pattern for herself or for others in an easy and simple manner.

The invention (in a preferred form) is illustrated in the drawings and hereinafter more fully described.

In the drawings:

Fig. 1 is a plan view of one of the scales used in the system embodying the principles of my invention.

Fig. 2 is a plan view of another of the scales.

Fig. 3 is a view of the opposite surface of the scales shown in Fig. 2.

Fig. 4 is a diagrammatic view illustrating the manner in which the gores constituting the pattern for the corset are laid out by the use of the scales.

As shown in the drawings:

The small scale shown in Fig. 1, termed the "Alice" scale, is straight along one side edge and at its ends, and the other edge is curved. Printed on the surface of the scale, parallel to and adjacent the straight side edge thereof is a table comprising four columns extending longitudinally of the scale, the first laid off in inches from one to seven, the next column lettered at its upper end with the word "Hip" containing the even numerals from 32 to 60 inclusive, the third column lettered with the word "Waist" containing the even numerals from 20 to 34 inclusive, and the last column lettered with the word "Bust", containing the even numerals from 32 to 62 inclusive. These various numerals represent the measurements in inches taken of a person to be fitted, and are disposed in their respective columns with a certain relation to the inches scale or column.

The other scale termed the "Glenn" scale, as shown in Figs. 2 and 3, has one straight side edge with the other curved, and has printed on the top surface thereof two scale tables, one of which is denoted by the words "Use this scale for gore XXX" and the other by the words "Use this scale for gore XXXX." The first table contains four columns, of which the first is laid off in inches from one to seven, the second lettered with the word "Bust" and containing the even numerals 32 to 54 inclusive, the third, lettered with the word "Waist" and containing the even numerals 20 to 44 inclusive, and the last or fourth column lettered with the word "Hip" and containing the even numerals 32 to 48 inclusive. The scale table denoted by the letters "Gore XXXX" also consists of four columns, the first of which is laid off in inches from 1 to 9, the second column, lettered with the word "Bust" containing the even numerals from 32 to 52 inclusive, the third column, lettered with the word "Waist" containing the even numerals from 20 to 36 inclusive, and the fourth column lettered with the word "Hip" containing the even numerals from 32 to 54 inclusive. The arrangement of the various numerals in the various columns of the above mentioned tables bears a certain relation to the inches scales or columns thereof, and the use thereof will be hereinafter pointed out.

The opposite surface of the "Glenn" scale shown in Fig. 2, is shown in Fig. 3, and has printed thereon directional arrows and reference words for use of the curved edge portion of the scale, as will be hereinafter pointed out.

The operation is as follows:

The pattern for the corset consists of gores X, XX, XXX, XXXX, and XXXXX, which are laid out and obtained in the manner described with reference to Fig. 4. The following measurements of a person to be fitted with the corset are first taken by means of a tape or other suitable means for the purpose, to-wit, the bust line, the waist line, the hip line, the distance under the arm from bust line down to waist line and from waist line down to hip line and from hip line down to the bottom line at which the corset is to reach. The small scale termed the "Alice" scale is used to lay out the gores X and XX, and the large scale termed the "Glenn" scale is used to lay out the gores XXX, XXXX, and XXXXX. A piece of paper substantially 42 inches long and 24 inches wide is pinned or tacked smoothly upon a table or other surface, and a three foot rule or yard stick or other straight edge is obtained for drawing lines.

First the horizontal line AB is drawn at the top of the paper, and this line is lettered at its middle "Bust line," and in the example about to be illustrated the particular bust line measurement is also noted thereon, which is 36 inches. The line AC is next laid off at the left end of the paper at right angles to the line AB, the distance from A to C is being the length of the corset in front. Another line DE is laid off on the paper parallel to the line AB and spaced downwardly therefrom a distance equal to the distance of the bust line down to the waist line, and this line is lettered "Waist line" and the measurement in the present instance 24 inches is noted thereon. The next line laid off is the line FG, parallel to the line AB and DE, and spaced as many inches below the waist line as the measurement taken from the waist line to the hip line, and this line is lettered "Hip line" and the measurement 40 inches in the present instance denoted thereon. The line C to Z is then drawn parallel to the line FG and being of course as many inches below the hip line as desired for the bottom of the corset. In laying out the pattern these lines and their various intersections must all be carefully lettered as the work proceeds to avoid confusion and future mistakes.

Now take the "Alice" scale, and after finding the bust measure in the bust column, note the number of inches opposite thereto on the inches column, and in the present instance it will be seen that for the bust reading 36, the inches reading is 1½, and this measurement is laid off on the line AB from the point A to 3 by use of the inches column on the "Alice" scale. In the event that the bust line or any of the measurements for that matter are odd or fractional numbers, the measurements are obtained by estimation between the even numerals which are in the columns. Again using the scale the inches reading in the inch column corresponding to the waist measurement 24, is obtained and laid off on the line DE, thus locating the point 4. The number of inches in the inch column corresponding to the hip measure 40, is obtained and laid off on the line FG, the point thus located being denoted by the numeral 5. The small line KK is next drawn parallel to and three eighths of an inch below the line D4, and the line MM, parallel to the line KK, and three eighths of an inch below the same. The "Alice" scale is next laid on the diagram, with the point of the arrow on the scale (which is marked "Bust curve for gore X begins here") at the point 3, and a curved line is drawn along the edge of the scale from 3 to 4, and down to M, and a straight line is drawn from M through 5, to the bottom line, and this intersection gives the point 6, which is so marked on the bottom line CZ. This completes the gore X.

The point 7, is next located one inch to the right of the point 3, on the line AB, and the straight vertical line 7—10, is drawn therefrom, parallel to the line AC. The gore XX, is then laid off exactly in the manner in which the gore X was obtained, inasmuch as gore XX is an exact duplicate of gore X, and the intersections of the boundary lines of the gore XX with the waist and hip lines of the diagram are denoted respectively by the reference numerals 8, 14, 9, and 15, and with the letter P placed at the intersection of the line M 15, with the line CZ. The "Alice" scale is now laid aside and the "Glenn" scale used.

The gore XXX is obtained by first locating the point 16, on the line AB one inch to the right of the point 13, then drawing a vertical line 16—18, parallel to the line AB intersecting the waist line and continued as a dash line from the point K, which is three eighths of an inch below the waist line down to the bottom line CZ, the point at which the same crosses the hip line being noted by the numeral 25, and its intersection with the bottom line by the numeral 23. The point K, is three eighths of an inch below the waist line. The line KK is then drawn parallel to the waist line, and three eighths of an inch below the same. The point 20, on the hip line is obtained by measuring half an inch to the left of the point 25, and a straight line is then drawn from K on the line 16—23, through 20 to the bottom line, and its intersection therewith denoted by the numeral 22.

Now find the bust measure on the "Glenn" scale and locate point 17 on bust line by measuring off the number of inches found on the scale corresponding to the bust measure in the same manner in which the points 3 and 13 were found for gores X and XX. Next find the waist line measurement on the "Glenn" scale marked for gore XXX and after obtaining the inches reading corresponding thereto, locate the point 19, on the waist line of the diagram. Then find the inches measurement on the "Glenn" scale marked for gore XXX, for the hip line measurement given, and locate point 21, on line FG measuring to the right from the point 20. To obtain the upper curve on the gore XXX, turn the "Glenn" scale wrong side up and place arrow point (marked "Back curve for gore XXX begins here") at point 19 on waist line, and draw curved line along edge of scale in the direction indicated by long arrow up to 17, on bust line. Then turn the scale right side up and place arrow point (marked "Hip curve for gore XXX begins here") on point 19 on waist line and draw curved line along edge of scale as indicated by the long arrow through 21, to the bottom line, locating the point 24, at the intersection therewith. This completes the gore XXX.

The gore XXXX differs from the preceding gores in that it is begun on the hip line, locating the point 32, about six or seven inches to the right of the point 21, on the hip line FG. The number of inches on the "Glenn" scale marked for gore XXXX corresponding to the known hip measure is obtained and the point 29, measured to the right on the hip line from the point 32, equal to the inches reading. A vertical dotted line is then drawn upwardly from the point 29, perpendicular to the hip line intersecting the bust line AB at the point 35. Next measure one inch to the left of the point 35, on the bust line to locate the point 27, and draw line 27—28 parallel to dotted line 35—29, down to the waist line DE. A slanting line is next drawn from the point 28, through the point 29, intersecting the bottom line CZ at the point 30. The inches reading on the "Glenn" scale marked for gore XXXX corresponding to the bust measure is next obtained and measured to the left from the point 27, on the bust line AB to locate the point 26, and the inches reading corresponding to the waist measurement on the same scale is obtained and measured off to the left from the point 28, on the wast line DE, locating the point 33. To obtain a boundary curve for the gore XXXX above the waist, the "Glenn" scale is laid right side up on the diaphragm with the curved edge marked "Curve above waist line to bust line for gores XXXX and XXXXX begins here", so disposed that the arrow point registers with the point 33, and the curve is then drawn to the point 26. The "Glenn" scale is next turned over, that is with the wrong or reverse side up, and laid on the diagram with the arrow point on the curved edge marked "Hip curve for gore XXXX begins here" registered with the point 33, and a curved line is then drawn along the edge of the scale in the direction of the long arrow thereon through the point 32, down to the bottom line, and the intersection therewith marked with the numeral 31. This completes the gore XXXX.

The gore XXXXX is the same for all sizes, bust three inches, waist one and one half inches, and hip three inches; except that for very large women one inch should be added to each of these measurements. A straight line is drawn from the point 3, parallel to the line AC, that is down to Z, and the point 40, is located by measuring three inches to the left of B on the bust line. The point 39, is next located by measuring one and one half inches to the left of E on the waist line and the point 41, is located by measuring three inches to the left of D on the hip line. The "Glenn" scale is laid on the diagram right side up with the arrow point at the "Curve above waist line to bust line for gores XXXX and XXXXX begins here" registered with point 39, and a curved line is drawn along the edge of the scale in the direction of the other arrow to the point 40, and a slanting line is then drawn connecting the point 39, with 41, and continued to the insertion 42, with the bottom line CZ.

The pattern now laid out is for one half of the corset, and the gores are cut out and laid on double-piece goods with the straight edges of the gores laid along the straight line edge of the material. It is necessary to allow one quarter of an inch on all sides for seams in cutting the goods from the pattern, and the pattern allows two inches for lacing in the back. The goods as cut out is sewed together and provided with a casing tape to receive boning to stiffen the corset, and proper eyelets for the lacing are inserted by a suitable tool for the purpose.

I am aware that various details of construction may be varied through a wide range without departing from the principles of this invention, and I therefore do not purpose limiting the patent granted otherwise than necessitated by the prior art.

I claim as my invention:

1. A method of laying out a corset pattern consisting of a duplicate set of five gores, consisting of a set of scales, one edge of each of which is curved, and tables printed on said scales to obtain corresponding inch measurements for location of points on the gores in laying out the same for different combinations of bust, waist and hip line measurements.

2. In a method for constructing a corset pattern of a plurality of gores, a plurality of tables of various bust, waist and hip line measurements, and an inch scale forming a part of each of said tables to obtain an inch reading for the different combinations of hip, waist and bust line measurements to lay off the different gores constituting the corset pattern.

3. In a method for constructing corset patterns comprising a plurality of gores, a plurality of tables for the different gores containing columns of various bust, waist and hip line measurements, an inch scale forming a part of each of said tables whereby an inch reading for corresponding bust, waist or hip line measurements may be obtained to lay off the width of the gores at different points, and curved scales with certain portions of the curvature thereof marked for use in laying out the boundary lines of the gores after the dimensions thereof have been determined.

4. A method for laying out corset patterns made up for a plurality of gores, consisting in the use of tables for the determination of the dimensions of said gores, said dimensions corresponding to the different combinations of bust, waist and hip line measurements of the persons to be fitted, and scales having curved edges for joining the different dimensional points of the gores to properly shape the same to form a corset when the goods is cut out according to the outline of the gores.

In testimony whereof I have hereunto subscribed my name in the presence of two subscribing witnesses.

ARTHUR C. McCLAUGHRY.

Witnesses:
CHARLES W. HILLS, Jr.,
EARL M. HARDINE.

Copies of this patent may be obtained for five cents each, by addressing the "Commissioner of Patents, Washington, D. C."